March 25, 1930. C. A. BORGESON 1,751,723
DISAPPEARING LAWN SPRINKLER
Filed Dec. 28, 1925 2 Sheets-Sheet 1
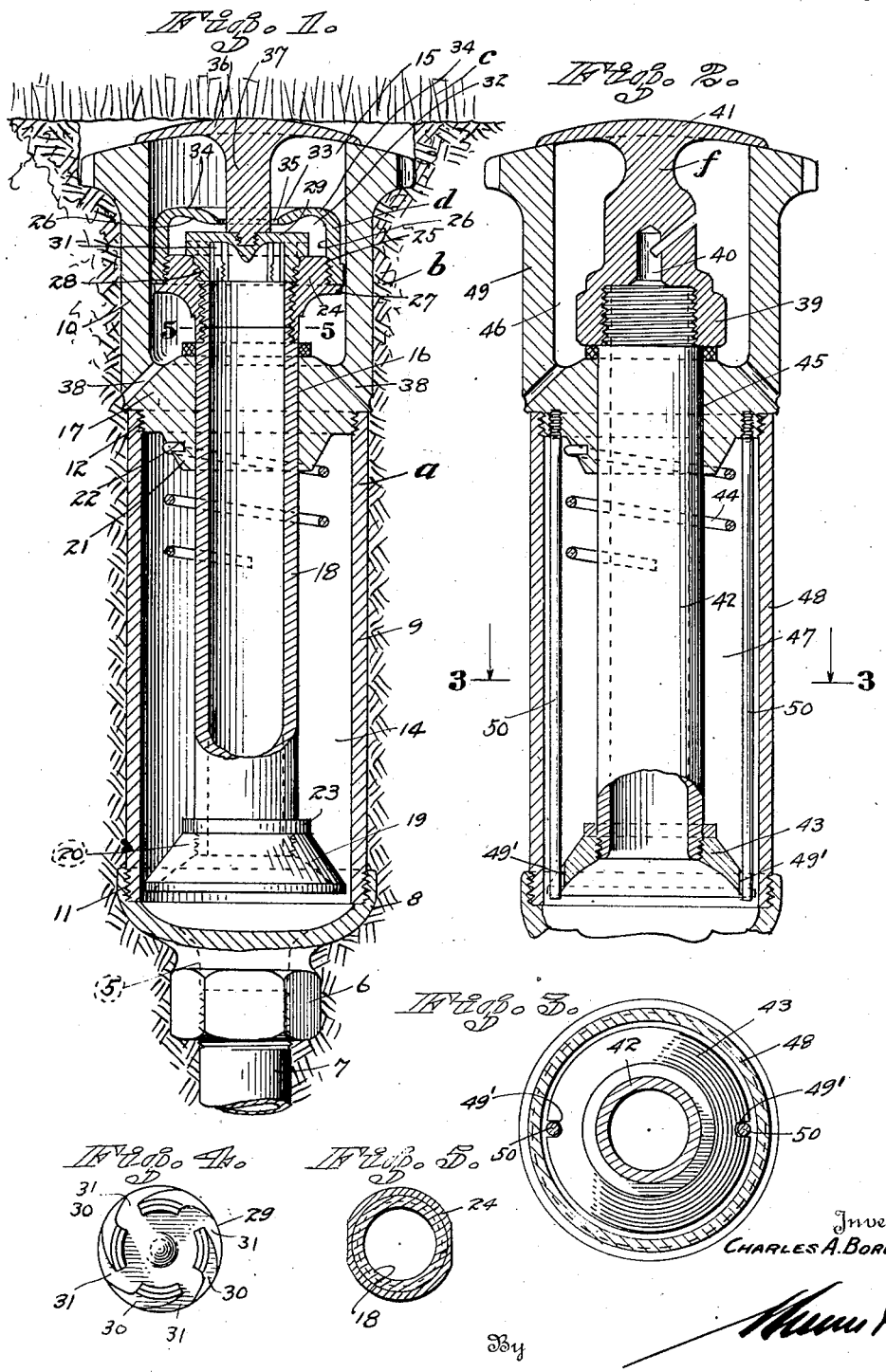
Inventor
CHARLES A. BORGESON
By
Attorneys March 25, 1930. C. A. BORGESON 1,751,723
DISAPPEARING LAWN SPRINKLER
Filed Dec. 28, 1925 2 Sheets-Sheet 2
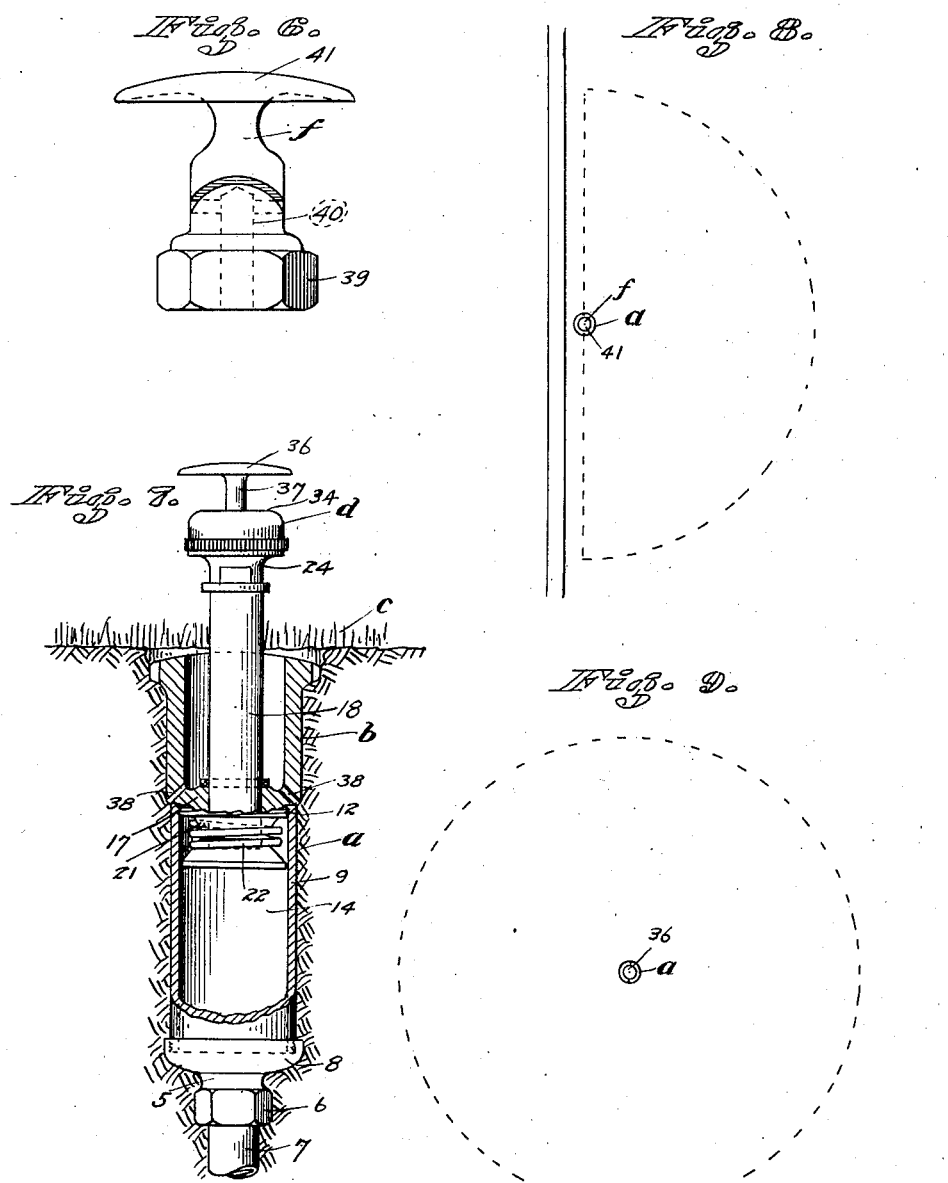
Inventor
CHARLES A. BORGESON Patented Mar. 25, 1930

1,751,723

UNITED STATES PATENT OFFICE

CHARLES A. BORGESON, OF SAN FRANCISCO, CALIFORNIA

DISAPPEARING LAWN SPRINKLER

Application filed December 28, 1925. Serial No. 78,026.

The present invention has for its general object to improve the construction and the operation of disappearing lawn sprinklers by adapting the projectable nozzle in a device of this kind to respond more readily to the action of water pressure in rising to operative position, and further in providing against accidental binding on the part of the nozzle that would prevent the automatic lowering thereof upon turning off the water supply.

A further object is to provide for automatically closing the upper end of the casing when the device is inoperative and, at the same time, provide a closure structure which is constructed so as to prevent manipulation thereof by the hand alone of unauthorized persons.

The above and other objects are accomplished by instrumentalities pointed out in the following specification.

The invention is clearly defined in the claims.

A satisfactory embodiment of the invention is illustrated in the accompanying drawings forming part of the specification and in which:

Figure 1 is a vertical longitudinal section showing one form of the device arranged within the ground and in inoperative position.

Figure 2 is a view similar to Figure 1, but showing a modified form of sprinkler head.

Figure 3 is a horizontal cross section on the line 3—3 of Figure 2.

Figure 4 is a detail bottom plan view of the distributing member.

Figure 5 is a detail cross section on the line 5—5 of Figure 1.

Figure 6 is a detail front elevation of the one-way sprinkler head shown in Figure 2.

Figure 7 is a view similar to Figure 1, but on a reduced scale, and showing the nozzle in operative position.

Figure 8 is a view showing by dotted lines the contour of the area upon which water is directed with the sprinkler head shown in Figure 6, and Figure 9 is a view showing the contour of the area upon which water is directed with the sprinkler heads shown in Figures 1 and 7.

The sprinkler $a$ of the present invention is adapted to be arranged upright within an opening in the ground $b$ so that the upper end of the sprinkler will be flush or substantially so with the surface of the ground $b$ which arrangement will not prevent an ordinary lawn mower from being operated over the surface of the ground to cut the blades of grass $c$. The lower end of the sprinkler $a$ is provided with a passage shown by dotted lines and indicated by 5 and this passage is surrounded by a screw threaded boss 6 which is adapted to be screwed upon or otherwise suitably connected to a standard 7 which forms part of the service pipe arrangement embedded in the ground $b$. Sprinkler $a$ is formed of metal, preferably brass, and for convenience in manufacturing, I show the casing as being formed of a lower section 8, an intermediate section 9 and an upper section 10. The lower section 8 carries boss 6 and is screwed upon or otherwise detachably connected to the lower end of section 9, as indicated by 11. Section 10 is screwed upon or otherwise detachably connected to the other end of section 9, as indicated by 12. The sections 8 and 9 are tubular and their interiors form a chamber 14 which is in open communication with passage 5. Upper section 10 is hollow to provide an upper chamber 15 which opens through the upper end of section 10 and is concentric with a guideway 16 formed in the lower end 17 of upper section 10. The guideway is in the form of a circular open-ended opening extending through the bottom, and is provided for the reception of the body portion 18 of the nozzle which is slidably fitted in the guide 16. The body portion 18 is an open-ended tubular construction and provision is made in any suitable manner for widening the lower end of the body 18 in order to adapt the device to be readily responsive to the action of water pressure within the casing 14.

In the present instance I have shown a frusto-conical base 19 secured to the lower end of body 18 by being screwed thereupon as indicated by 20. The base 19 fits nicely within chamber 14 and is adapted to slide within the chamber. The bottom 17 of upper section 10 is centrally provided with a boss 21 which forms a stop or abutment for the nozzle 16 when the same moves upwardly to a predetermined extent. The boss 21 also provides a supporting means for one end of coiled spring 22 which surrounds the body 18 of the nozzle, the spring being relatively short and compressible by the base 19 when the nozzle moves upwardly.

A gasket 23 is disposed upon the upper end of base 19 and surrounds the body 18, and when carried into contact with base 21 operates to prevent leakage of water around the body 18 disposed within the guide 16. The upper end of body 18 is disposed within chamber 15 of upper section 10 and carries a sprinkler head, indicated generally by $d$ in Figure 1. This head $d$ of Figure 1 is adapted to distribute water over a circular area as shown by dotted lines in Figure 9. The head comprises a collar 24 screwed upon the upper end portion of nozzle 18; the upper end portion of the collar located beyond the body 18 being peripherally screw threaded as at 25 to accommodate an interiorly screw threaded cap 26 and also provided with a flange 27 upon which the cap bears when screwed upon the collar 24. The collar 24 is interiorly counterbored and screw threaded for the reception of the exteriorly screw threaded body portion 28 of a distributor. The upper end of the body portion 28 of the distributor is provided with a canopy or cover 29 shown by bottom plan in Figure 4. Inwardly extending curved ribs 30 on the lower face of cover 29 are disposed in such spaced relation as to provide curved passages 31 which extend through the side wall of the body of the distributor at the collar 24, as shown in Figure 4, and also in Figure 1. The outside area of the cover of the distributor is so proportioned to the internal area of cap 26 that a circular chamber 32 is provided into which the water enters from passages 31. By reason of the contour of passages 31, the water upon entering chamber 32 is caused to move in a curved line. The top plate 33 of cap 26 is centrally depressed, the cross sectional contour of the surface of the depression being convex as shown in Figure 1 and indicated by 34. The central depression of the top plate 33 causes the central portion thereof to be disposed relatively near to the top or canopy 29, but the intervening space, which is chamber 32, gradually increases in depth or height toward the side wall of cap 26. Thus it will be seen that the passage through chamber 32 is constricted at the outlet opening 35 which is at the center of the top plate 33 of cap 26. By reason of this construction, the velocity of the water is increased in passing through the constricted space adjacent to the outlet opening 35 so that the water moves outwardly over the curved surface 34 at a higher rate of speed than is had by the water upon entering the chamber 32. This increase in the velocity of the outwardly moving water through outlet opening 35 causes a sheet of water upon emerging through outlet 35 to divide itself into small drops of varying sizes, the drops falling uniformly in concentric circles extending practically from the edge of the opening in which the sprinkler is disposed to a considerable distance outwardly therefrom, depending upon the extent of pressure within the service pipe 7. The closure plate 36 is of a size somewhat greater than the upper open end of chamber 15, and a depending shank 37 from the central portion of plate 36 extends through outlet opening 35, and is screwed into a socket made to receive it in the upper face of canopy 29. The closure plate 36 operates to support nozzle 18, with the flared base thereof slightly spaced from the lower end of the nozzle as shown. The edge of closure plate 36 is rounded and the undersurface conforms to the curvature of the upper end of upper section 10 so that the closure plate is held in contact therewith when the sprinkler is inoperative, by the weight of the nozzle 18 and the parts connected thereto.

With this construction the closure plate prevents the entrance of foreign matter into chamber 15 when the sprinkler is not in use, and the construction of the edge portion prevents the closure plate from being raised by the hand alone.

In the use of the device thus far described, a separate valve is by preference employed for controlling the flow of water through pipe 7, and when this valve is opened and water enters upwardly and into chamber 14, the pressure of the water operating upon base 19 operates to move the nozzle upwardly until the gasket 23 abuts boss 21. By virtue of the increased area had by the base 19, the water pressure on the lower end of the nozzle will be relatively great. When the water is turned off, the tension of spring 22 operates to overcome any binding between the nozzle and the guide 16, and thereby operates to initially move the nozzle downwardly in the case of such binding, after which the nozzle is restored to its normal position by gravity. Suitable outlet or drain openings 38 extend downwardly and outwardly from the bottom of chamber 15 and provide for the escape of water that may leak or otherwise enter into chamber 15. It should be noted that the distributor whirls the water thus causing it to issue at such an angle as to clear the closure plate 36. This permits the water to break into drops sooner than if it had hugged the closure.

Before the cover 36 is raised from the rim, the water will swirl around in the compartment 15 completely filling it and will float any foreign matter in the compartment. Upon the raising of the cover, the water issuing from the opening 35 will force the dirty water out from the receptacle and will clean the rim.

In Figure 2 I have shown a modified form of sprinkler head, indicated by *f*. This form of head is constructed to sprinkle in one direction and in a semi-circle, as shown by dotted lines in Figure 8. The head comprises an upright shank portion 39 which is provided with a screw threaded bore extending inwardly from the lower end of the head and terminating in a relatively small chamber 40. The shank is provided with a transverse recess extending downwardly and obliquely with respect to the vertical axis of the shank and communicating with chamber 40. As shown in Figure 6 the length of the recess at its base portion is approximately three times the diameter of chamber 40, and the chamber 40 extends through the middle portion of the base of the recess so that equal portions of the recess are disposed on opposite sides of the chamber.

With this construction a sheet made up of finely divided particles of water and conforming in contour to the dotted line shown in Figure 8, is projected from the sprinkler head when the device is in operation. The head terminates at its upper end in a closure cap 41, similar in construction to the closure cap 36, and the nozzle 42 is screwed into the base of the head. The lower end of the nozzle is enlarged, as indicated by 43, which enlargement may follow the construction described for Figure 1, and a spring 44, similar to spring 22 is employed for overcoming any tendency on the nozzle to bind in the guide way 45 in which the nozzle 42 is slidingly fitted. The sprinkler head *f* is normally disposed within an upper chamber 46, and the lower chamber 47 which is within the tubular section 48 connected to the upper section 49, provides a housing for the nozzle 42. The enlarged portion 43 is notched at opposite points, as indicated by 49' in Figure 3, which notches receive guide rods 50 depending from the bottom of upper section 49 and disposed within the casing 48. The presence of the guide rods prevents accidental turning movement of the sprinkler head *f* when in operative or inoperative positions.

Although I have shown and described one embodiment of my invention, it is to be understood that the same is susceptible of various changes; and I reserve the right to employ such as may come within the scope of the appended claims.

I claim:

1. In a lawn sprinkler, a casing, a nozzle slidably mounted in said casing, water actuated means for raising said nozzle into operative position, and spring means adapted to be tensioned after said nozzle has moved a predetermined distance, said spring means acting in the initial movement of said nozzle into inoperative position.

2. A lawn sprinkler comprising a casing having a recess in the top thereof and a dome-shaped rim, a nozzle slidably mounted in said casing and being receivable in said recess when in inoperative position, a dome-shaped cover secured to said nozzle for closing said recess when seated on the rim, said cover being dome-shaped and having its periphery rounded so as to merge into the rim when seated and prevent the cover from being manually grasped and moved, and water actuated means for raising said nozzle.

CHARLES A. BORGESON.